United States Patent [19]
Kelly

[11] Patent Number: 6,092,344
[45] Date of Patent: Jul. 25, 2000

[54] ROOFING SYSTEM FOR A COOLED BUILDING

[76] Inventor: Thomas L. Kelly, 31 Sands St., Waterbury, Conn. 06710

[21] Appl. No.: 09/067,290

[22] Filed: Apr. 27, 1998

[51] Int. Cl.⁷ .................................................. E04B 1/66
[52] U.S. Cl. ............................................. 52/410; 52/411
[58] Field of Search ............................ 52/408, 409, 410, 52/411, 746.11, 745.06, 749.12

[56] References Cited

U.S. PATENT DOCUMENTS

| | | | |
|---|---|---|---|
| 4,021,982 | 5/1977 | Kotcharian | 52/410 |
| 4,441,295 | 4/1984 | Kelly | 52/408 |
| 4,850,166 | 7/1989 | Taylor | 52/408 |
| 4,937,990 | 7/1990 | Paquette | 52/408 |
| 5,212,927 | 5/1993 | Sheahan | 52/410 |
| 5,644,880 | 7/1997 | Lehnert et al. | 52/408 |

*Primary Examiner*—Michael Safavi
*Attorney, Agent, or Firm*—Cantor Colburn LLP

[57] ABSTRACT

A roofing system for use with a cooled building. A first layer of insulation is attached to the roof deck using fasteners. A vapor barrier is formed over the fasteners. A second layer of insulation is formed over the vapor barrier. A board weighs down the second layer of insulation and a waterproof layer is formed over the board. The roofing system prevents thermal conduction into the refrigerated building while allowing the roof to be vented.

2 Claims, 7 Drawing Sheets

ROOFING SYSTEM FOR A COOLED BUILDING

BACKGROUND OF THE INVENTION

1. Field of the Invention

The invention relates generally to a roof for a refrigerator or freezer building and in particular to a roofing system that prevents thermal conduction into the building and allows venting of the roof.

2. Prior Art

FIG. 1 is a cross sectional view of a conventional roof for a refrigerator or freezer building. A deck 3 is attached to purlins 2 through mechanical fasteners 4. An insulation board 8 is placed on top of the deck 3 and attached to the deck 3 by mechanical fasteners 10. A vapor barrier 7 is placed over the insulation board 8. This roof construction has several disadvantages. Because the fasteners 10 extend from the warm side of the roof to the cool side of the roof, thermal conductivity occurs through fasteners 10 thus reducing the cooling efficiency of the refrigerator or freezer building. The vapor barrier 7 must be placed on the warm side of the roof. In a refrigerator/freezer building, this is outside of the building. Because the vapor barrier 7 is formed on the top of the roof, there is no way to vent the roof.

SUMMARY OF THE INVENTION

The above-discussed and other drawbacks and deficiencies of the prior art are overcome or alleviated by the roofing system of the invention. A first layer of insulation is mechanically attached to a deck. A vapor barrier is formed on top of the mechanically fastened insulation. Additional layers of insulation are placed loose over the vapor barrier. A weighted board is placed over the additional layer of insulation and a waterproof layer is placed above the weighted board. The roofing system prevents thermal conductivity through the insulation while allowing the roof to be vented.

BRIEF DESCRIPTION OF THE DRAWINGS

Referring now to the drawings wherein like elements are numbered alike in the several figures.

DETAILED DESCRIPTION OF THE INVENTION

Figure 1:
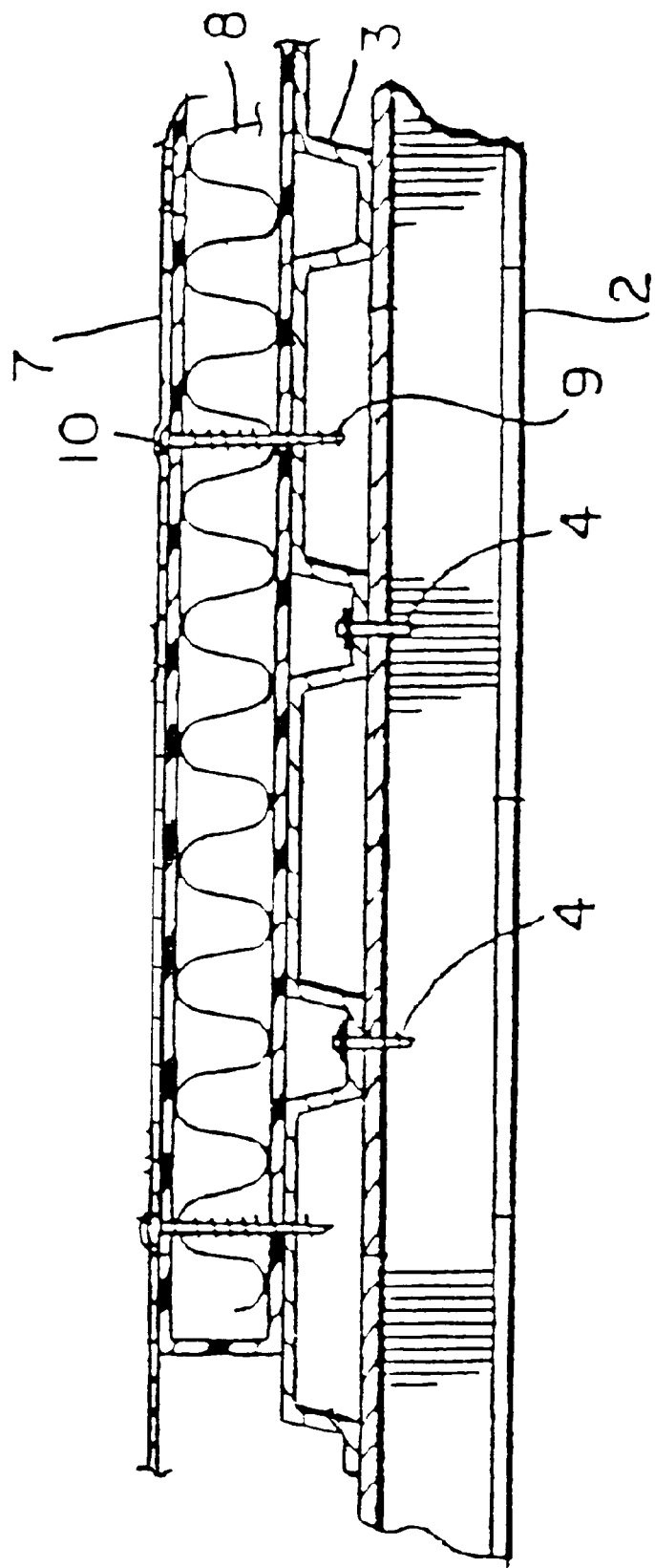
FIG. 1 is a cross-sectional view of a conventional roofing system.
Figure 2:
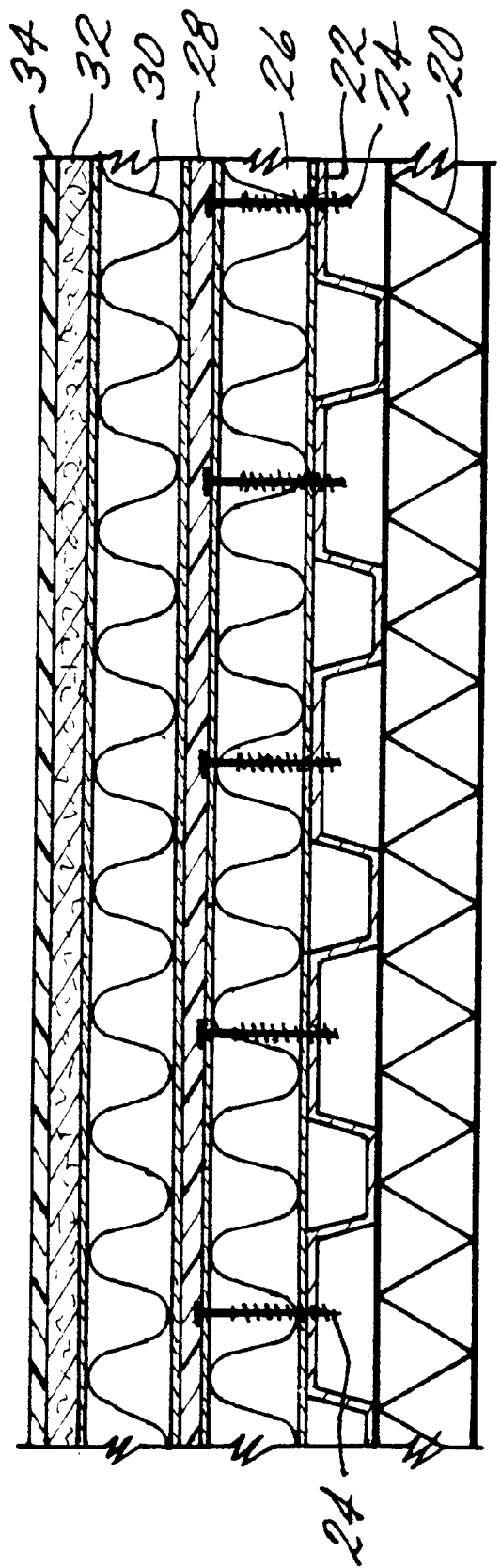
FIG. 2 is a cross sectional view of the roofing system of the present invention.

Referring now to FIG. 2, there is shown the layers making up the roofing system of the present invention. As shown in FIG. 2, the roofing system includes purlins 20 on which a deck 22 is positioned. A layer of insulation 26 is attached to the deck 22 through fasteners 24. It is understood that more than one layer of insulation may be fastened to the deck 22 depending on the desired "R" value. The "R" value of the insulation should be sufficient to raise the dew point above freezing at its top surface. A vapor barrier 28 is positioned above the fasteners 24. The vapor barrier (air seal) 28 may be formed a variety of ways including, but not limited to, a polymeric membrane film attached to each fastener 24, a flood coat of hot tar, a hot mopped roof ply, or a foil and/or craft paper liquid adhesive.

Above the vapor barrier 28 is an additional layer of insulation 30 which may be laid loose, spot adhered or totally adhered to the vapor barrier 28. Above the second layer of insulation 30 is a board 32. The board 32 weighs down the second layer of insulation 30 and may be made from gypsum, dens deck, fiber board or wonder board. Lastly, a waterproof layer 34 is positioned above the board 32. The waterproof layer may be laid loose or mechanically attached to the board 32.

The roof structure of FIG. 2 is intended for use with a refrigerated building. Of course, the roof system may be used with any building where the temperature inside the building is lower than the temperature outside the building. Accordingly, the vapor barrier 28 is positioned on the warm side of the roof structure. However, the fasteners 24 do not extend past the vapor barrier 28 or the second insulating layer 30. Therefore, there is no heat conduction along fasteners 24.

Figure 3:
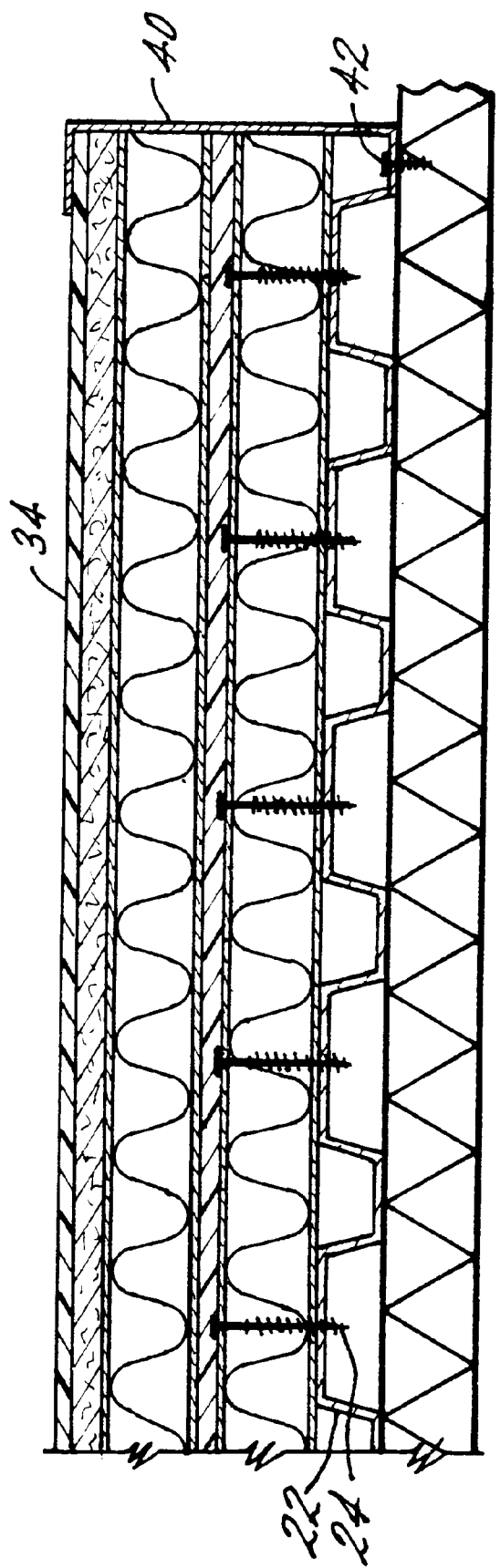
FIG. 3 is a cross sectional view of the roofing system including a mechanical attachment strip.
Figure 4:
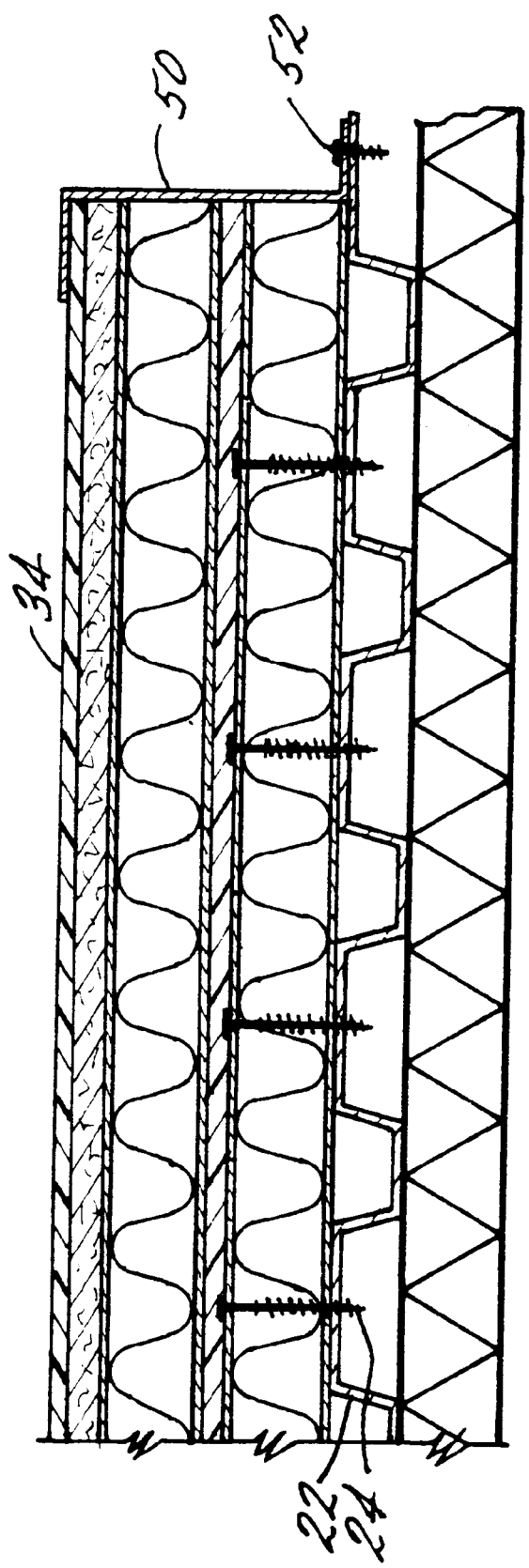
FIG. 4 is a cross sectional view of the roofing system including a mechanical attachment strip.
Figure 5:
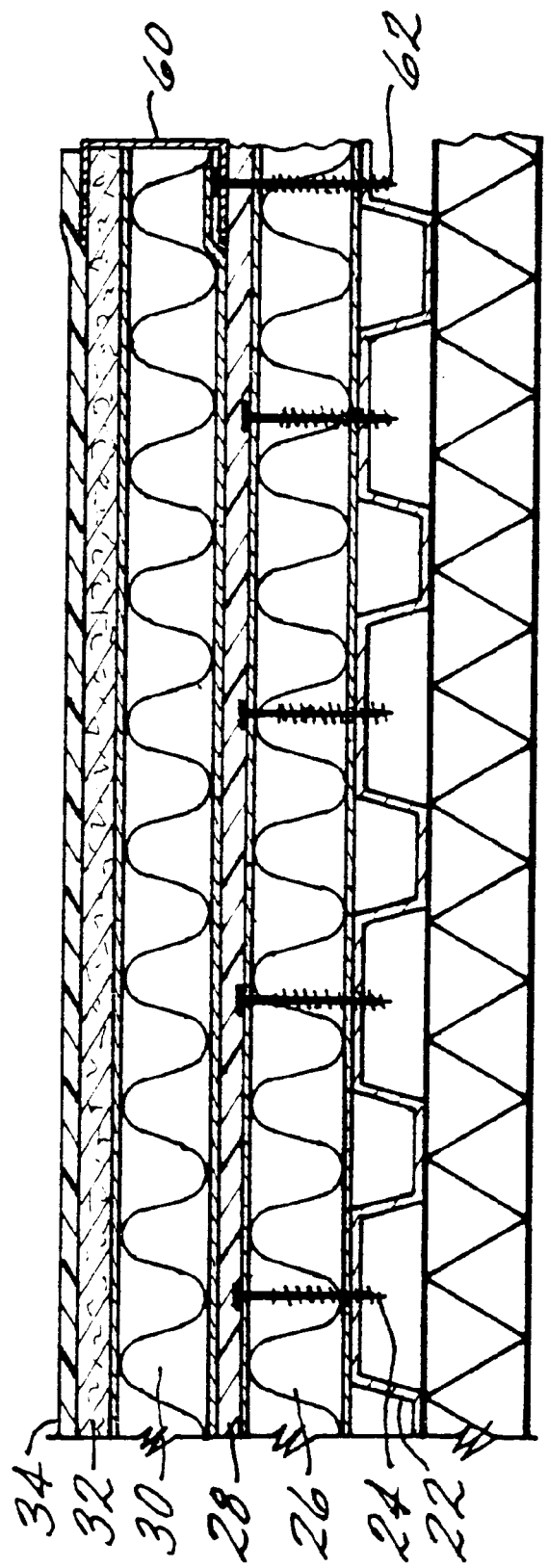
FIG. 5 is a cross sectional view of the roofing system including a mechanical attachment strip.

FIG. 3 is a cross sectional view of the roofing system of the present invention illustrating a mechanism for securing the roofing system to the purlins. A mechanical attachment strip in the form of a C-channel 40 extends from the waterproof layer 34 to the deck 22 and is attached to the purlins through fasteners 42. FIG. 4 shows an alternative arrangement where the mechanical attachment strip is a Z-channel 50 is used to secure the roof system. The z-channel extends from the waterproof layer 34 to the deck 22 and is connected to the deck 22 through fasteners 52. FIG. 5 shows another embodiment in which the mechanical attachment strip 60 is a c-channel that extends over the waterproof layer 34 and the vapor barrier 28 and is connected to deck 22 through fasteners 62. An insulative material is placed around the head of fastener 62 to prevent conduction of heat through insulation layer 26. In the embodiments shown in FIGS. 3–5, the waterproof layer 34 is attached to the mechanical attachment strip through an adhesive.

Figure 6:
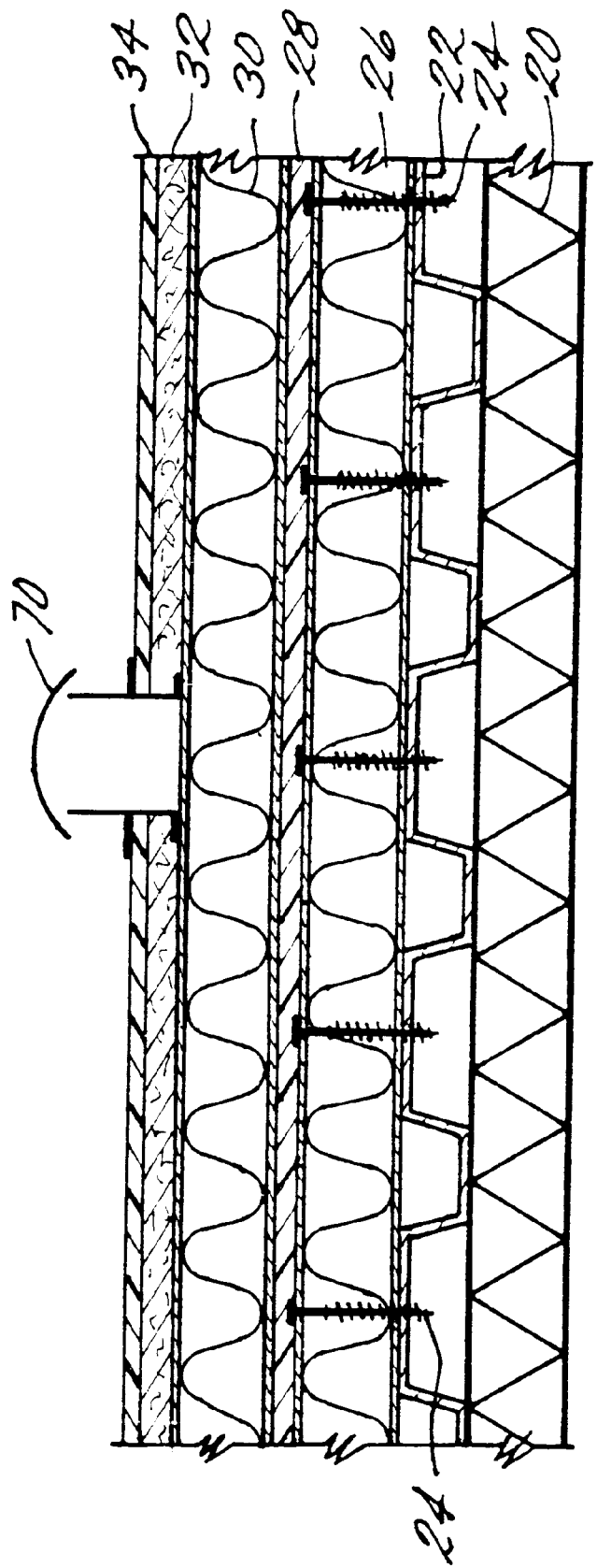
FIG. 6 is a cross sectional view of the roofing system including a equalizer valve.
Figure 7:
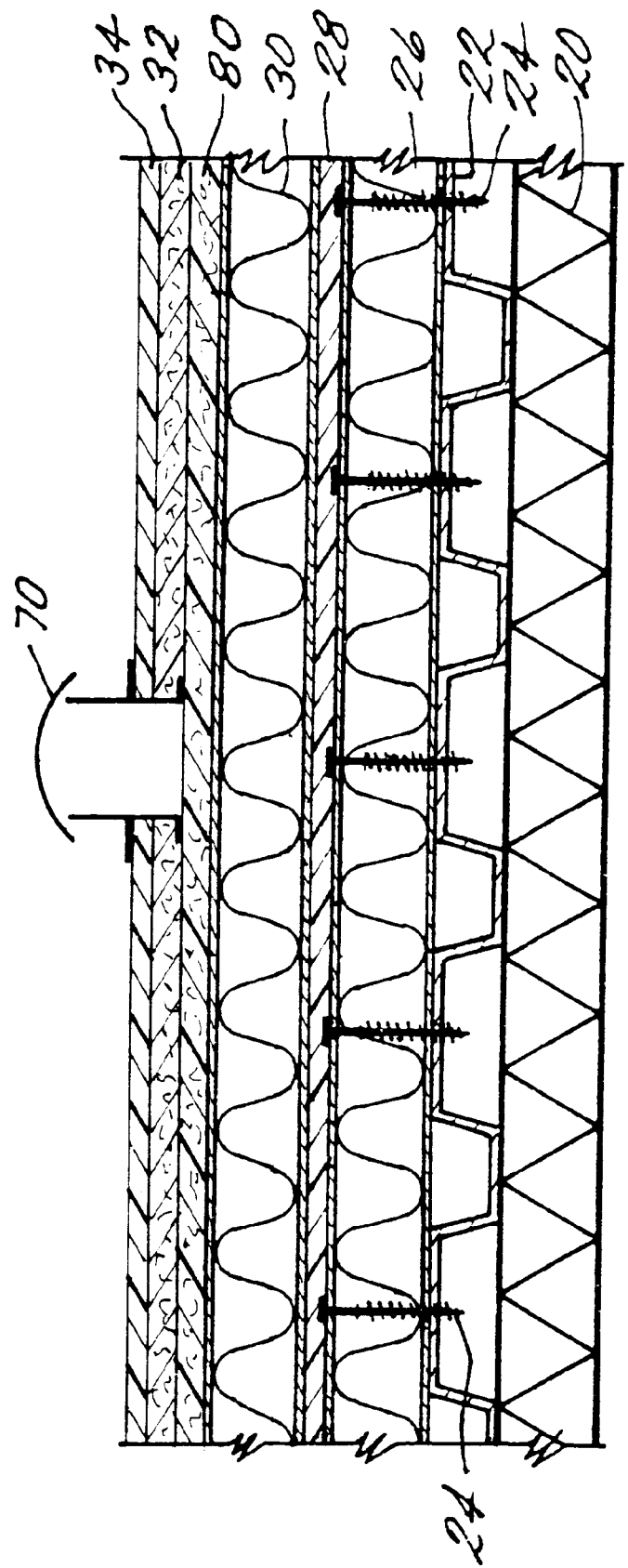
FIG. 7 is a cross sectional view of the roofing system including an air permeable layer for use with the equalizer valve.

FIG. 6 shows an alternative embodiment including a equalizer valve 70 installed in wind vortex areas through the waterproof layer 34 and the board 32. Venting of roofs is needed in order to prevent the roof from becoming damaged by zones of low pressure above the roof. FIG. 7 shows an alternative embodiment in which an air permeable layer 80 is provide between the board 32 and the second layer of insulation 30. The air permeable layer helps vent the roof system and may be made from spun bound polyester or fiberglass or a BUR cap sheet with mineral granules.

The present invention provides a roof structure for use with cooled buildings (having an interior temperature that is lower than the exterior temperature) that prevents thermal conduction along fasteners. The fasteners are beneath a vapor barrier and positioned between two layers of insulation to prevent temperature conduction along the fasteners. The roof system includes a board positioned above the second layer of insulation. The roof system allows the roof to be vented and prevents thermal conduction along fasteners.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A roofing system comprising:

a deck;

a layer of insulation positioned above said deck;

a plurality of fasteners connecting said layer of insulation to said deck;

a vapor barrier formed above said fasteners;

a second layer of insulation positioned above said vapor barrier;

a board positioned above said second layer of insulation;

a waterproof layer positioned above said board; and a c-channel mechanical attachment strip positioned between said waterproof layer and said deck.

2. A roofing system comprising:

a deck;

a layer of insulation positioned above said deck;

a plurality of fasteners connecting said layer of insulation to said deck;

a vapor barrier formed above said fasteners;

a second layer of insulation positioned above said vapor barrier;

a board positioned above said second layer of insulation;

a waterproof layer positioned above said board; and a z-channel mechanical attachment strip positioned between said waterproof layer and said deck.

* * * * *